(12) United States Patent
Travis

(10) Patent No.: US 10,178,378 B2
(45) Date of Patent: Jan. 8, 2019

(54) BINOCULAR IMAGE ALIGNMENT FOR NEAR-EYE DISPLAY

(71) Applicant: Microsoft Technology Licensing, LLC, Redmond, WA (US)

(72) Inventor: Adrian Travis, Cambridge (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 177 days.

(21) Appl. No.: 15/097,199

(22) Filed: Apr. 12, 2016

(65) Prior Publication Data

US 2017/0295362 A1 Oct. 12, 2017

(51) Int. Cl.
H04N 13/327 (2018.01)
H04N 13/383 (2018.01)
(Continued)

(52) U.S. Cl.
CPC ....... H04N 13/327 (2018.05); G02B 27/0172 (2013.01); G03H 1/0005 (2013.01); H04N 13/128 (2018.05); H04N 13/344 (2018.05); H04N 13/383 (2018.05); *G02B 2027/011* (2013.01); *G02B 2027/014* (2013.01); *G02B 2027/0132* (2013.01); *G02B 2027/0138* (2013.01); *G03H 2001/0077* (2013.01)

(58) Field of Classification Search
CPC ........... H04N 13/0425; H04N 13/0022; H04N 13/044; G02B 27/0172; G02B 27/017; G02B 2027/011; G02B 2027/0132; G02B 2027/0138; G03H 1/0005; G03H 2001/0077

See application file for complete search history.

(56) References Cited

U.S. PATENT DOCUMENTS 8,866,702 B1* 10/2014 Wong ............... G02B 27/017
 345/7
9,429,756 B1* 8/2016 Cakmakci .......... G02B 27/0172
(Continued)

FOREIGN PATENT DOCUMENTS

DE 102008015527 A1 10/2009
EP 2887124 A1 6/2015
WO 9923524 A1 5/1999

OTHER PUBLICATIONS

ISA European Patent Office, International Search Report and Written Opinion Issued in PCT Application No. PCT/US2017/026029, dated Jul. 7, 2017, WIPO, 12 Pages.
(Continued)

*Primary Examiner* — Marnie A Matt
(74) *Attorney, Agent, or Firm* — Alleman Hall Creasman & Tuttle LLP

(57) ABSTRACT

A near-eye display device comprises a left-eye optical system and a right-eye optical system. Each of the left-eye optical system and the right-eye optical system comprises a holographic optical component positioned in a field of view of a user eye, an image source configured to emit imaging light, and an alignment optical component, wherein projection beam path between the image source and the light-deflecting optical component and an alignment beam path between the alignment optical component and the light-deflecting component share a common optical path.

19 Claims, 9 Drawing Sheets

(51) Int. Cl.
*H04N 13/344* (2018.01)
*H04N 13/128* (2018.01)
*G02B 27/01* (2006.01)
*G03H 1/00* (2006.01)

(56) References Cited

U.S. PATENT DOCUMENTS

| | | |
|---|---|---|
| 2008/0024391 A1 | 1/2008 | Oliver et al. |
| 2009/0153437 A1 | 6/2009 | Aharoni |
| 2010/0103075 A1* | 4/2010 | Kalaboukis ............. A63F 13/02 345/8 |
| 2011/0216089 A1 | 9/2011 | Leung |
| 2012/0120103 A1 | 5/2012 | Border et al. |
| 2012/0206452 A1 | 8/2012 | Geisner et al. |
| 2012/0242678 A1* | 9/2012 | Border ............... G02B 27/0093 345/589 |
| 2013/0187943 A1* | 7/2013 | Bohn ................. H04N 13/0425 345/619 |
| 2014/0300632 A1* | 10/2014 | Laor .................... G06T 19/006 345/633 |
| 2014/0375542 A1 | 12/2014 | Robbins et al. |
| 2015/0035744 A1* | 2/2015 | Robbins ............... G02B 27/017 345/156 |
| 2015/0241700 A1* | 8/2015 | Schowengerdt ........ G06T 13/40 345/633 |
| 2015/0268467 A1 | 9/2015 | Cakmakci et al. |
| 2015/0331241 A1* | 11/2015 | Haddick ................... G06T 7/80 345/629 |
| 2016/0018639 A1* | 1/2016 | Spitzer .................... G02B 5/30 345/156 |
| 2016/0027215 A1* | 1/2016 | Burns ................ G02B 27/0172 345/419 |
| 2016/0117864 A1* | 4/2016 | Cajigas .................... G09G 5/00 345/633 |
| 2016/0246055 A1* | 8/2016 | Border ................. G02B 27/017 |

OTHER PUBLICATIONS

Wu, et al., "Depth-disparity calibration for augmented reality on binocular optical see-through displays", in Proceedings of the 6th ACM Multimedia Systems Conference, Mar. 18, 2015, pp. 120-129.
U.S. Appl. No. 14/589,513, Travis, et al., "Virtual Image Display With Curved Light Path", filed Jan. 5, 2015. 32 pages.
"Camera Auto-Calibration" Wikipedia article, page last modified: Jul. 2, 2015 Available at: https://en.wikipedia.org/wiki/Camera_auto-calibration.
Hansen, et al., "Online Continuous Stereo Extrinsic Parameter Estimation" International conference on Computer Vision and Pattern Recognition, Jun. 2012. 8 pages.
Kohler, Thomas, "Comparison of Self-Calibration Algorithms for Moving Cameras" Department of Computer Science and Mathematics. University of Applied Sciences. Apr. 2010. 106 pages.

* cited by examiner

BINOCULAR IMAGE ALIGNMENT FOR NEAR-EYE DISPLAY

BACKGROUND

A near-eye display device may provide virtual images to a user's eye to provide an immersive augmented-reality experience. A virtual image may be provided in various ways. In one example, a near-eye display device may include an image source configured to project an image along an optical path via one or more optical components to a user's eye.

SUMMARY

Examples related to the binocular alignment of near-eye display devices are disclosed. In one example, a near-eye display device comprises a left-eye optical system and a right-eye optical system. Each of the left-eye optical system and the right-eye optical system comprises a light-deflecting optical component positioned in a field of view of a user eye, an image source configured to emit imaging light, and an alignment optical component, wherein a projection beam path between the image source and the light-deflecting optical component and an alignment beam path between the alignment optical component and the light-deflecting component share a common optical path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A binocular near-eye display device may project separate virtual images to each of a left eye and a right eye of a user to provide an immersive augmented-reality experience. As described in more detail below, a binocular near-eye display device may include separate optical systems for each of the left eye and the right eye of the user, wherein each optical system includes an image source configured to project a virtual image through an optical component (e.g., a light guide). The optical component directs the virtual image to a volume hologram, which directs the virtual image toward a user's eye.

In such a device, there is a risk that left-eye and right-eye virtual images may not be properly aligned. For example, the separate left-eye and right-eye optical systems may become misaligned due to one or more optical components in either of the optical systems bending, twisting, or otherwise deforming. In a device with a flexible frame, such optical components may deform during placement of the near-eye display device on the user's head, and/or in other situations. Such misalignment of the virtual images projected to each of the left eye and right eye, even by a fraction of a degree, may lead to the misaligned presentation of stereoscopic images.

Accordingly, examples are disclosed that relate to calibrating separate left-eye and right-eye optical systems of a binocular, near-eye display device to align virtual images projected separately to a left eye and a right eye of a user. As described in more detail below, each of the left-eye optical system and the right-eye optical system includes optical components arranged to form a common optical path along which both image light and alignment light travel. The image light is used to form a virtual image, and the alignment light is used to calibrate the left-eye and right-eye optical systems of the binocular near-eye display device to align a left-eye image provided to a left eye of the user with a right-eye image provided to a right eye of the user. Because both the image light and the alignment light use a common optical path in each of the optical systems, deformation of the common optical path affects the image light and the alignment light identically for the optical system. Accordingly, images provided by the left-eye optical system and the right-eye optical system may be aligned relative to each other even where either of the left-eye or right-eye optical path becomes deformed.

Figure 1:
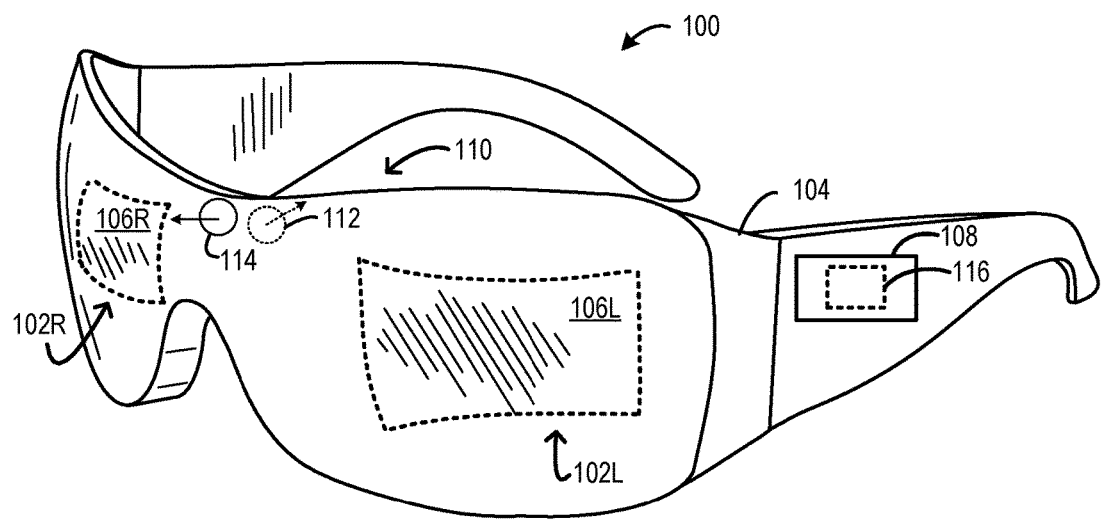
FIG. 1 shows an example near-eye display device.

FIG. 1 shows aspects of a binocular near-eye display device 100. The display device 100 includes right-eye and left-eye optical systems 102R and 102L mounted to a frame 104 configured to rest on a wearer's head. Each of the right-eye and left-eye optical systems 102 include light-deflecting image display componentry configured to project computerized virtual imagery into left and right display windows 106R and 106L in the wearer's field of view (FOV). In one example, the light-deflecting image display componentry includes one or more holographic optical components configured to deflect image light. An example optical system 200 representative of the right-eye and left-eye optical systems 102R and 102L is described in more detail below with reference to FIGS. 2A-2B and 3-9.

In some implementations, the right and left display windows 106R and 106L are wholly or partially transparent from the perspective of the wearer, to give the wearer a clear view of his or her surroundings. In some implementations, the right and left display windows 106R, 106L are opaque, such that the wearer is completely absorbed in the virtual-reality (VR) imagery provided via the near-eye display device. In some implementations, the opacity of the right and left display windows 106R, 106L is controllable dynamically via a dimming filter. A substantially see-through display window, accordingly, may be switched to full opacity for a fully immersive virtual-reality experience.

Display device 100 includes an on-board computing system 108 configured to render the computerized display imagery, which is provided to right and left display windows 106 via right-eye and left-eye optical systems 102. Computing system 108 is configured to send appropriate control signals to right display window 106R that cause the right display window to form a right display image. Likewise, the computing system 108 is configured to send appropriate control signals to left display window 106L that cause the left display window to form a left display image. The wearer of the display device 100 views the right and left display images with right and left eyes, respectively. When the right and left display images are composed and presented in an appropriate manner, the wearer experiences the perception of virtual imagery—i.e., one or more virtual objects at specified positions, and having specified 3D content and other display properties. Such virtual imagery may have any desired complexity; it may, for example, comprise a totally virtual scene having both foreground and background portions, or one of foreground and background to the exclusion of the other.

Operation of the display device 100 is additionally or alternatively controlled by one or more computing devices (e.g., remote from the display device 100) in communication with the display device 100. The computing system 108 may include a logic subsystem and a storage subsystem, as discussed in more detail below with respect to FIG. 11.

The computing system 108 is in communication with various sensors and vision system components of the display device 100 to provide information to the computing system 108. Such sensors may include, but are not limited to, position-sensing componentry 110, a world-facing vision system 112, and a wearer-facing vision system 114. The position-sensing componentry 110 is usable by the computing system 108 to determine the position and orientation of the display device 100 in an appropriate frame of reference. In some implementations, the position-sensing componentry 110 provides a six degrees-of-freedom (6DOF) estimate of the three Cartesian coordinates of the display system plus a rotation about each of the three Cartesian axes. To this end, the position-sensing componentry 110 may include any, some, or each of an accelerometer, gyroscope, magnetometer, and global-positioning system (GPS) receiver. The output of the position-sensing componentry 110 is used to map the position, size, and orientation of virtual display objects onto the right and left display windows 106.

The world-facing machine vision system 112 may include one or more of a color or monochrome flat-imaging camera, a depth-imaging camera, and an infrared projector. The term 'camera' refers herein to any machine-vision component having at least one optical aperture and sensor array configured to image a scene or subject. The depth-imaging camera may be configured to acquire a time-resolved sequence of depth maps of a scene or subject. In some implementations, discrete flat-imaging and depth-imaging cameras may be arranged with parallel optical axes oriented in the same direction. In some implementations, image or video output from the flat-imaging and depth-imaging cameras may be co-registered and combined into a unitary (e.g., RGB+depth) data structure or stream. In examples in which depth-imaging camera is a suitably configured time-of-flight depth-imaging camera, a data stream representing both depth and brightness (e.g., IR+depth) may be available by combining outputs differing in phase.

The infrared projector is configured to emit infrared alignment light to the physical space. The infrared alignment light may be reflected from the physical space back to the display device 100 and imaged by a camera of each of the left-eye and right-eye optical systems 102R and 102L.

The world-facing vision system 112 may be configured to measure environmental attributes of a physical space surrounding display device 100. In some examples, the computing system 108 may use such environmental data to determine the position and orientation of the display device 100, calibrate the left-eye optical system 102L with the right eye optical system 102R to align a virtual image presented to a left eye of the user by the left-eye optical system 102L with a virtual image presented to a right eye of the user by the right eye optical system 102R, align the virtual images presented by the left-eye optical system 102L and the right eye optical system 102R with the physical space, and/or perform other operations.

In some implementations, the display device 100 may include a wearer-facing machine vision system 114. The wearer-facing machine vision system 114 may include a color or monochrome flat-imaging camera, a depth-imaging camera, and/or an infrared projector. The wearer-facing vision system 114 is configured to measure attributes of a wearer of display device 100. In some examples, such attribute data is used by computing system 108 to calibrate the left-eye optical system 102L with the right-eye optical system 102R, as well as to determine a position of the wearer's eye(s), a gaze vector, a gaze target, a pupil position, head orientation, eye gaze velocity, eye gaze acceleration, change in angle of eye gaze direction, and/or any other suitable eye tracking information.

In some implementations, the computing system 108 may include an object-recognition engine configured to compare objects resolved by the vision systems 112 and 114 to a plurality of objects stored in a database or defined heuristically, and to identify a match. The object-recognition engine 116 may be employed to calibrate the left-eye optical system 102L with the right-eye optical system 102R. Further, in some implementations, the object-recognition engine 116 may be employed to align virtual images generated by the left-eye optical system 102L with the right-eye optical system 102R with the physical space.

Figure 2A:
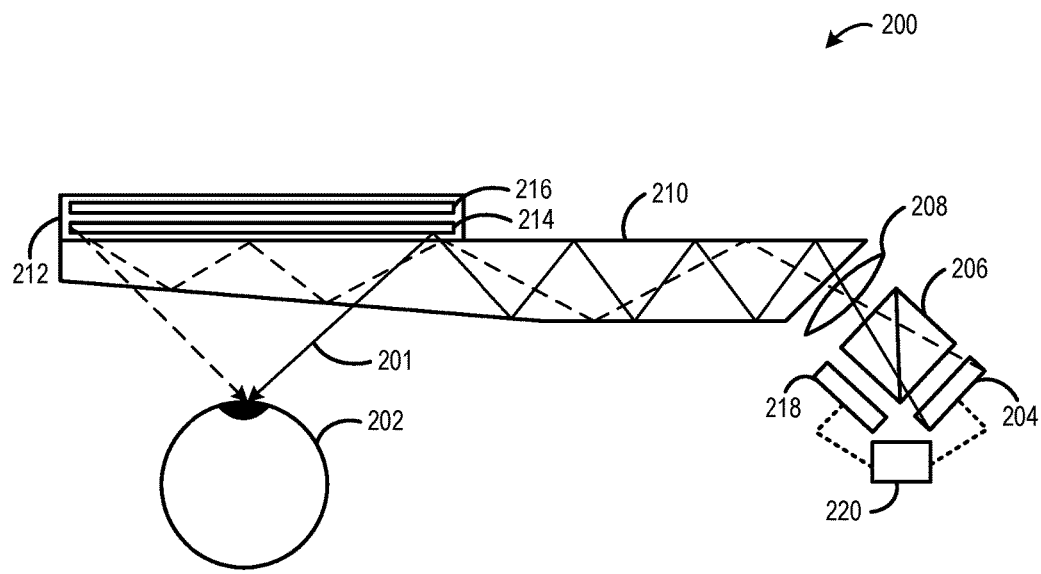
FIGS. 2A-2B shows an example optical system for a near-eye display device.
Figure 2B:
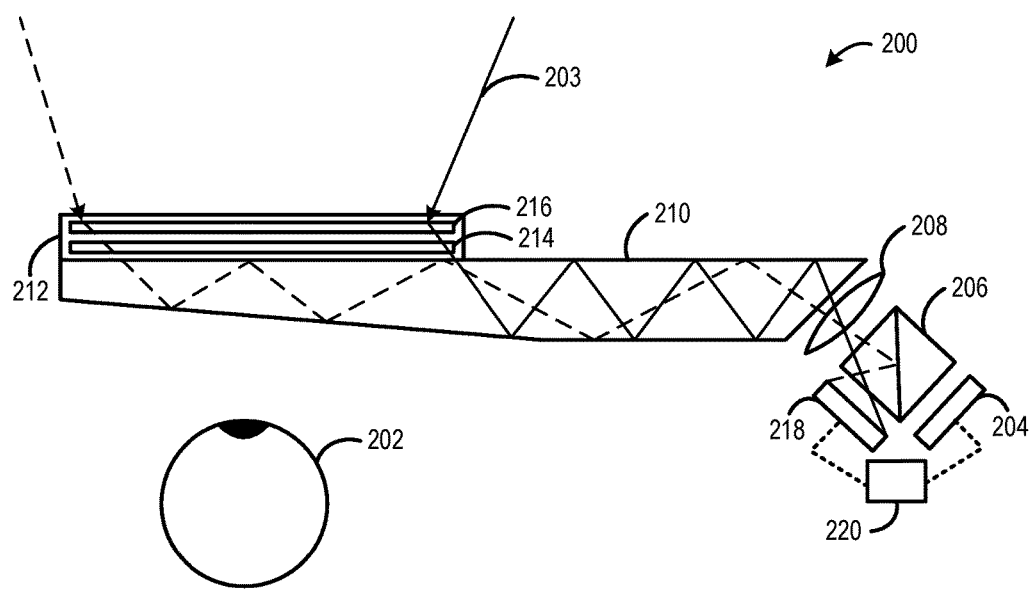

FIGS. 2A-2B show an example optical system 200 in simplified form. The optical system 200 is an example of a system that may be used as the left-eye optical system 102L and the right-eye optical system 102R of the display device 100 of FIG. 1, and/or with any other suitable near-eye display device. FIG. 2A shows the optical system 200 providing image light 201 to a user eye 202, while FIG. 2B shows the optical system 200 emitting or receiving alignment light 203, depending upon the alignment method used. The alignment light 203 is used to calibrate the optical system 200 with a corresponding right-eye optical system, as discussed in further detail below.

As shown in FIG. 2A, an image source 204 outputs the image light 201 to a beam splitter 206. The image source 204 may take any suitable form, including but not limited to, a liquid crystal display (LCD) or liquid crystal on silicon (LCOS) display. The image source 204 may employ any suitable backlight or other illumination source. In one example, the image source 204 may include one or more laser light sources (e.g., laser diodes) to provide spatially coherent image light 201 to the beam splitter 206. A laser has a narrow linewidth (e.g., emits light at a single wavelength) that may produce little or no perceptible rainbow effect when diffracted by a hologram. The image source 204 may provide the image light 201 to the beam splitter 206 in any suitable manner. In some implementations, the image source 204 may provide the image light 201 to the beam splitter 206 at a fixed angle of incidence. In other implementations, the image source 204 may vary the angle of incidence at which the image light 201 is provided to the beam splitter 206.

The image light 201 travels along an optical path from the image source 204, through the beam splitter 206, and to the lens 208. Any suitable type of beam splitter 206 may be used, including but not limited to, a dielectric mirror, a prism cube, and a polarizing beam splitter. In some implementations, the beam splitter 206 may be omitted from the optical system 200, and the image light 201 may travel directly from the image source 204 to the lens 208, or may travel through a different optical component.

The lens 208 is configured to direct the image light 201 at a suitable angle to enter a wave guide 210. In other implementations, the optical system 200 may additionally or alternatively include an input coupling prism, embossed grating, volume hologram, slanted diffraction grating, or other coupling structure.

The image light 201 may propagate through the wave guide 210 by total internal reflection until it exits the wave guide 210 at a light-deflecting optical component 212. The wave guide 210 may take any suitable form. In the illustrated implementation, the wave guide 210 has a wedge shape. In other implementations, the wave guide 210 may have a more uniform thickness.

The light-deflecting optical component 212 is positioned adjacent the wave guide 210 in field of view of the user eye 202. In one example, the light-deflecting optical component 212 includes a holographic optical component. In another example, the light-deflecting optical component 212 includes an embossed grating. In yet another example, the light-deflecting optical component 212 includes a Fresnel lens. The light-deflecting optical component 212 may be configured to deflect different light beams in different directions in any suitable manner.

In the illustrated examples, the light-deflecting optical component 212 is described in terms of a holographic optical component, but may take other forms in other examples. The holographic optical component 212 comprises a holographic film that is applied to at least a portion of the display windows 106 of display device 100 of FIG. 1. The holographic optical component 212 may be located in any suitable position relative to the other components of the optical system 200. Further, the holographic optical component 212 may have any suitable shape and/or orientation. The holographic optical component 212 includes an image hologram 214 and an alignment hologram 216. In some implementations, the image hologram 214 and the alignment hologram 216 are recorded in a same or spatially overlapping position(s) on the holographic optical component 212, while these holograms may have different locations (e.g. formed in different layers) other examples.

The image hologram 214 is configured to diffract the image light 201 to the user's eye 202 to produce a virtual image. In this manner, the image light 201 travels along a projection beam path extending between the beam splitter 206 and the light-deflecting optical component 212.

Furthermore, the alignment hologram 216 is configured to redirect alignment light used to align the left-eye and right-eye optical systems. As such, the optical system 200 further includes an alignment optical component 218. In various implementations, and as shown in FIG. 2B, the alignment optical component 218 is configured to provide or receive the alignment light 203. In some implementations, the alignment optical component 218 includes a camera configured to acquire an alignment image from received alignment light 203. In such implementations, the alignment light 203 enters the optical system 200 via the alignment hologram 216, which diffracts the alignment light into the wave guide 210 at a suitable angle for the alignment light 203 to totally internally reflect through the wave guide 210. The alignment light 203 propagates through the wave guide 210, and exits the wave guide 210 toward the lens 208. The lens 208 directs the alignment light 203 into the beam splitter 206, which in this example is configured to direct the alignment light 203 to the camera to acquire an alignment image. In this manner, the alignment light 203 travels along an alignment beam path extending between the beam splitter 206 and the light-deflecting optical component 212.

The beam splitter 206 may direct light in different directions based upon any suitable optical characteristics that differ between the image light 201 and the alignment light 203. Examples include, but are not limited to, wavelength and polarization state. Where the beam splitter is a polarizing beam splitter, one or more polarizers (not shown) may be included in optical system 200.

In other implementations, the alignment optical component 218 includes an infrared projector configured to emit infrared alignment light 203. The infrared alignment light 203 travels through the optical system 200 along the same alignment beam path, but in the opposite direction, relative to implementations in which the alignment optical component 218 includes a camera. In such an implementation, the infrared projector emits the infrared alignment light 203 toward the beam splitter 206. The beam splitter 206 directs the infrared alignment light 203 through the lens 208 and into the wave guide 210. The infrared alignment light 203 propagates through the waveguide to the alignment hologram, which redirects the light into the physical environment. In implementations where the alignment optical component 218 emits infrared light, the display device may further comprise an infrared camera (e.g., a depth camera of either of the vision systems 112 or 114 of FIG. 1) configured to capture images of the infrared alignment light 203 reflected from the physical space to form an infrared alignment image, which is a two-dimensional image or a depth image.

Thus, the optical system 200 defines a common optical path extending between the beam splitter 206 and the holographic optical component 212 along which both the image light 201 travels along the projection beam path and the alignment light 203 travels along the alignment beam path.

Because the image light 201 and the alignment light 203 share a common optical path extending between the beam splitter 206 and the holographic optical component 212, an alignment light beam directed to or from the alignment optical component 218 passes through the holographic optical component 212 at a same position as an image light beam emitted from the image source 204. This optical relationship is true for each pixel of the holographic optical component 212. As a result, a virtual image that is provided to the user eye 202 is distorted in the same manner as the image acquired by the camera.

FIGS. 2A-2B also schematically show a computing system 220 that controls operation of the optical system 200. The computing system 220 may correspond to the computing system 108 of FIG. 1, and may control both left-eye and right-eye optical systems. The computing system 220 is configured to, among other operations, align the right-eye image source 204 with a corresponding image source of a left-eye optical system, and control the image source 204 to provide a virtual image to the user right eye 202 that is aligned with a virtual image provided to the user left eye.

The computing system 220 is configured to calibrate the image sources of each optical system based on alignment images generated from the alignment light 203, for example, to help compensate for various distortions in either of the optical systems due to defamation e.g., twisting or bending), and thus to align the virtual images provided to each user eye. For example, the computing system 220 may be configured to determine positional offsets (e.g., along the X axis and/or the Y axis of the field of view) of the virtual images provided by the image source of left-eye optical system and the image source of the right eye-optical system. Further, the computing system 220 is configured to calibrate these image sources based on the determined positional offsets in order to align the left-eye and right-eye virtual images. In another example, the computing system 220 may be configured to adjust one or more of the image sources to distort (e.g., stretch, shrink) at least a portion of the virtual image produced by the image source to compensate for any deformations of the associated optical system. The computing system 220 may be configured to adjust any suitable image production parameter during the calibration process to align the virtual images.

FIGS. 3-9 show various implementations of near-eye display devices having different arrangements of alignment optical components for aligning images produced by left-eye and right-eye optical systems in a stereoscopic display system. The various implementations are shown providing and/or receiving various light rays. Note that the light rays are shown for purposes of illustration, are not drawn to scale, and may not be an accurate representation of light paths used by an implementation.

Figure 3:
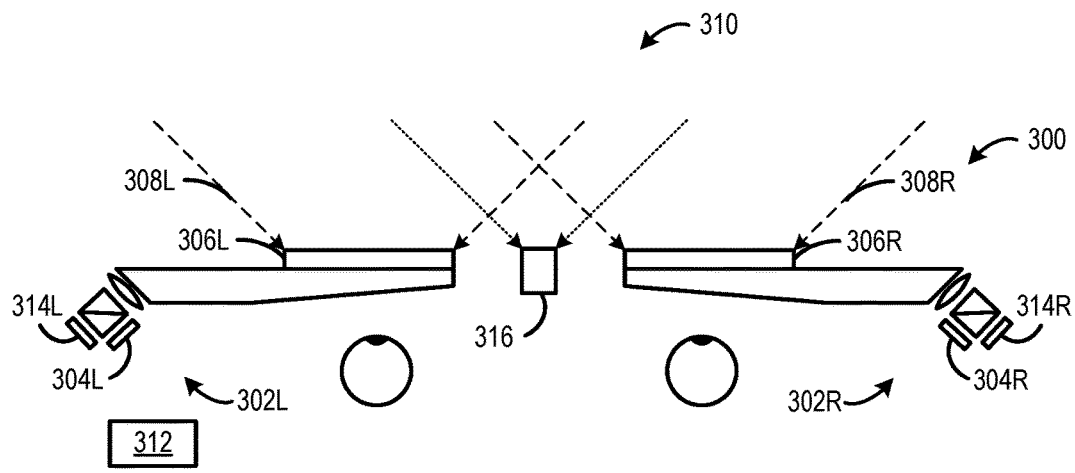
FIG. 3 shows a near-eye display device including left-eye and right-eye alignment optical components in the form of visible-light cameras directed to acquire images of a physical space.

FIG. 3 shows a display device 300 including a left-eye optical system 302L and a right-eye optical system 302R. The left-eye optical system 302L includes an alignment optical component in the form of a visible-light camera 304L, and the right-eye optical system 302R also includes an alignment optical component in the form of a visible-light camera 304R. The left-eye optical system 302L further includes a holographic optical component 306L configured to direct ambient alignment light 308L from a physical space 310 to the camera 304L. The camera 304L is configured to acquire an alignment image of the physical space 310 based on the alignment light 308L. Further, the holographic optical component 306L is configured to direct image light from the image source 314L to the user's left eye such that the user's left eye views a left-eye image.

Likewise, the right-eye optical system 302R includes a holographic optical component 306R configured to direct ambient alignment light 308R from the physical space 310 to the camera 304R. The camera 304R is configured to acquire an alignment image of the physical space 310 based on the alignment light 308R. Further, the holographic optical component 306R is configured to direct image light from the image source 314R to the user's right eye such that the user's right eye views a right-eye image.

A computing system 312 is configured to calibrate an image source 314L of the left-eye optical system 302L and an image source 314R of the right-eye optical system 302R based on the alignment image acquired by the camera 304L and the alignment image acquired by the camera 304R in order to align the left-eye image and the right-eye image.

The display device 300 also includes an outward-facing camera 316 configured to acquire an alignment image of the physical space 310 from light that does not travel through either the left-eye or the right-eye optical system (e.g., it is external to these two optical systems). This alignment image also may be referred to as an external alignment image, as it is acquired via a camera that is external to the left-eye and right-eye optical systems. In other words, the outward-facing camera 316 acquires the external alignment image from light received directly from the physical space 310. The outward-facing camera 316 may be a visible-light camera configured to acquire the external alignment image from ambient light, or may take any other suitable form. The outward-facing camera 316 may be positioned in any suitable location on the display device 300, for example, at a location between a left eye display and a right eye display. In one example, the outward-facing camera 316 is representative of a camera included in the world-facing vision system 112 of the display device 100 of FIG. 1.

As the outward-facing camera 316 is configured to acquire the external alignment image from ambient light that does not travel through either of the optical systems 302L, 302R, but is instead collected directly from the physical space 310, the external alignment image is free of any distortion caused by deformations of either of the optical systems 302L, 302R. The external alignment image may include an area of the physical space 310 that at least partially overlaps an area of the physical space 310 included in each of the alignment images acquired by the cameras 304L, 304R.

The computing system 312 is configured to align a left-eye image produced by the image source 314L and a right-eye image produced by the image source 314R with the physical space 310 based on a calibration of the alignment image acquired by the camera 304L, the alignment image acquired by the camera 304R, and the external alignment image acquired by the outward-facing camera 316. For example, the computing system 312 may be configured to align virtual objects in the left-eye image and the right-eye image with one or more real-world features of the physical space 310 based on a spatial registration between the alignment images.

The computing system 312 may be configured to perform any suitable machine vision algorithm to spatially register the images. Non-limiting examples of machine-vision algorithms that may be employed by the computing system 312 include, but are not limited to, Online Continuous Stereo Parameter Estimation, a Kalman Filter that incorporates a plurality of error metrics including bundle adjustment, epipolar constraints and trilinear constraints, and monocular visual simultaneous localization and mapping (SLAM). In some implementations, the computing system 312 may employ an object-recognition engine to perform one or more of these algorithms, such as the object-recognition engine 116 of FIG. 1. The computing system 312 may perform any of these and/or any other suitable machine vision operations as part of the alignment process.

Figure 4:
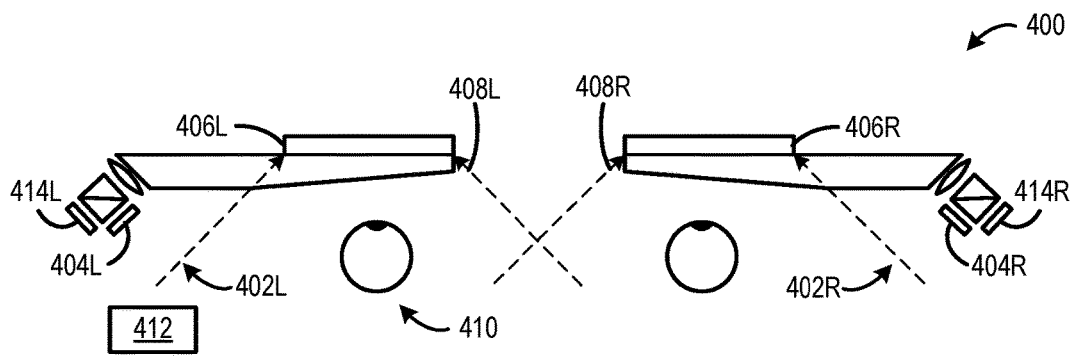
FIG. 4 shows a near-eye display device including left-eye and right-eye alignment optical components in the form of visible-light cameras directed to acquire images of a user.

FIG. 4 shows another example display device 400. The display device 400 differs from the display device 300 in that the display device 400 includes visible-light cameras to acquire alignment images of the user instead of the physical space. An outward-facing camera external to the left and right eye optical systems may be included, but is omitted in FIG. 4 for clarity.

The display device 400 includes a left-eye optical system 402L and a right-eye optical system 402R. The left-eye optical system 402L includes an alignment optical component in the form of a visible-light camera 404L, and the right-eye optical system 402R includes an alignment optical component in the form of a visible-light camera 404R. The left-eye optical system 402L includes a holographic optical component 406L configured to direct alignment light 408L reflected from a portion of the face of the user 410 to the camera 404L for imaging. The holographic optical component 406L also is configured to direct image light from the image source 414L to the user's left eye such that the user's left eye views a left-eye image. Likewise, the right-eye optical system 402R includes a holographic optical component 406R configured to direct alignment light 408L reflected from a portion of the face of the user 410 to the camera 404L for imaging. The holographic optical component 406R also is configured to direct image light from the image source 414R to the user's right eye such that the user's right eye views a right-eye image. A computing system 412 is configured to calibrate an image source 414L of the left-eye optical system 402L and an image source 414R of the right-eye optical system 402R to align the left-eye and right-eye images provided to the user's left and right eyes based on the alignment image acquired by the camera 404L and the alignment image acquired by the camera 404R.

Figure 5:
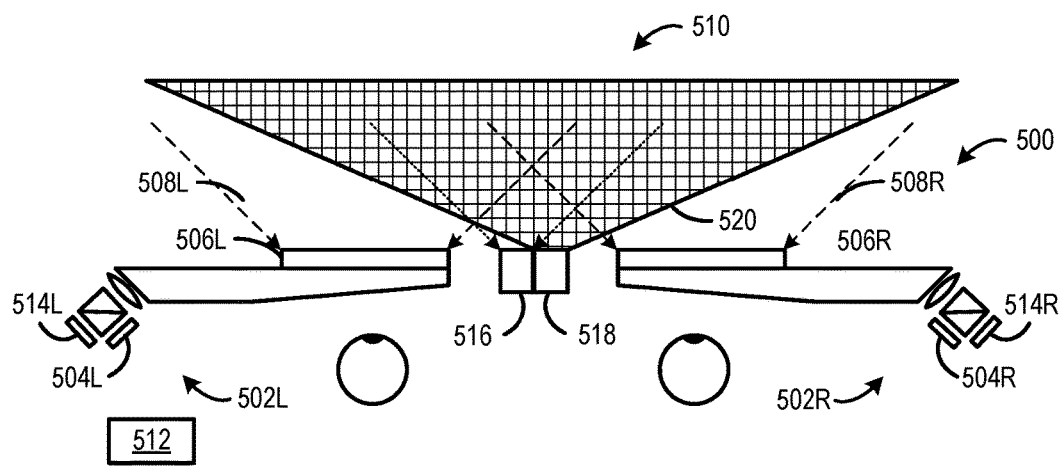
FIG. 5 shows a near-eye display device including left-eye and right-eye alignment optical components in the form of infrared cameras directed to acquire images of a physical space.

FIG. 5 shows another display device 500. The display device 500 differs from the previously described configurations in that the display device 500 includes an infrared projector that emits infrared light to a physical space. The infrared light is reflected back to infrared cameras of the optical systems to align left-eye and right-eye images provided by the optical systems to the user's eyes.

The display device 500 includes a left-eye optical system 502L and a right-eye optical system 502R. The left-eye optical system 502L includes an alignment optical component in the form of an infrared depth camera 504L, and the right-eye optical system 502R also includes an alignment optical component in the form of an infrared depth camera 504R. The display device 500 includes an infrared projector 518 configured to emit infrared light 520 into physical space 510. The infrared projector 518 may be configured to emit any suitable light. In one example, the infrared projector 518 emits infrared light in a pattern that is imaged by structured-light infrared cameras. In another example, the infrared projector 518 emits the infrared light as a pulse that is imaged by time-of-flight infrared cameras. In another example, the infrared projector 518 emits constant infrared light that is imaged by a flat infrared camera.

The left-eye optical system 502L includes a holographic optical component 506L configured to direct infrared alignment light 508L reflected from the physical space 510 to the depth camera 504L for imaging by the camera 504L. Further, the holographic optical component 506L is configured to direct image light from the image source 514L to the user's left eye such that the user's left eye views a left-eye image. Likewise, the right-eye optical system 502R includes a holographic optical component 506R configured to direct infrared alignment light 508R reflected back from the physical space 510 for imaging by camera 504R. Further, the holographic optical component 506R is configured to direct image light from the image source 514R to the user's right eye such that the user's right eye views a right-eye image. A computing system 512 is configured to calibrate an image source 514L of the left-eye optical system 502L and an image source 514R of the right-eye optical system 502R to align the left-eye and right-eye images provided to the user's left and right eyes based on the infrared alignment image acquired by the camera 504L and the infrared alignment image acquired by the camera 504R.

The display device 500 optionally includes an outward-facing depth camera 516 configured to acquire an infrared external depth alignment image of the physical space 510 from infrared light that does not travel through the optical systems. The outward-facing depth camera 516 is configured to acquire the infrared external alignment image from infrared light emitted by the infrared projector 518 that is reflected directly back from the physical space 510. The outward-facing depth camera 516 may be positioned in any suitable location on the display device 500. In one example, the outward-facing depth camera 516 is representative of a camera included in the world-facing vision system 112 of the display device 100 of FIG. 1.

The outward-facing depth camera 516 acquires the external infrared alignment image from infrared light that does not travel through either of the optical systems 502L, 502R, but is instead collected directly from the physical space 510. As such, the external alignment image is free of any distortion caused by deformations of either of the optical systems 502L, 502R. The external alignment image may include an area of the physical space 510 that at least partially overlaps an area of the physical space 310 included in each of the infrared alignment images acquired by the depth cameras 504L, 504R.

The computing system 512 is configured to align a left-eye image produced by the image source 514L and a right-eye image produced by the image source 514R with the physical space 510 based on a calibration of the infrared alignment image acquired by the depth camera 504L, the alignment image acquired by the depth camera 504R, and the infrared external alignment image acquired by the outward-facing depth camera 516. For example, the computing system 512 may be configured to align virtual objects in the left-eye image and the right-eye image with real-world features of the physical space 510 based on a spatial registration between the alignment images.

In some implementations, the computing system 512 may employ an object-recognition engine, such as the object-recognition engine 116 of FIG. 1, to register virtual objects in the left-eye and right-eye images with real-world objects in the physical space. The computing system 512 may perform any suitable machine vision operations as part of the calibration process.

Figure 6:
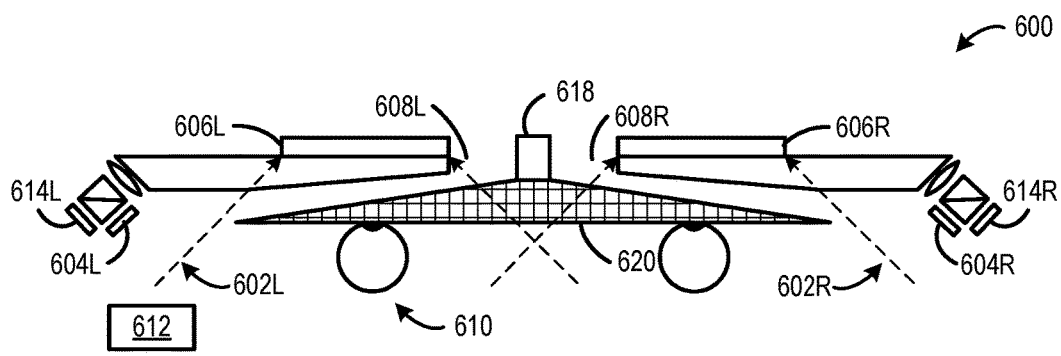
FIG. 6 shows a near-eye display device including left-eye and right-eye alignment optical components in the form of infrared cameras directed to acquire images of a user.

FIG. 6 shows a display device 600. The display device 600 differs from the above described configurations in that the display device utilizes infrared cameras configured to acquire infrared alignment images of the user instead of the physical space. An outward-facing camera external to the left and right eye optical systems may be included, but is omitted in FIG. 6 for clarity.

The display device 600 includes a left-eye optical system 602L and a right-eye optical system 602R. The left-eye optical system 602L includes an alignment optical component in the form of a depth camera 604L or other infrared camera, and the right-eye optical system 602R includes an alignment optical component in the form of a depth camera 604R or other infrared camera. The display device 600 includes an infrared projector 618 configured to emit infrared light 620 towards at least a portion of a user 610 (e.g., a portion of the user's face). The left-eye optical system 602L includes a holographic optical component 606L configured to direct infrared alignment light 608L reflected back from at least a portion of the user 610 to the depth camera 604L for imaging a portion of the user's face. The holographic optical component 606L also is configured to direct image light from the image source 614L to the user's left eye such that the user's left eye views a left-eye image. Likewise, the right-eye optical system 602R includes a holographic optical component 606R configured to direct infrared alignment light 608R reflected back from at least a portion of the user 610 to the depth camera 604R for imaging a portion of the user's face. Further, the holographic optical component 606R also is configured to direct image light from the image source 614R to the user's right eye such that the user's right eye views a right-eye image.

A computing system 612 is configured to calibrate an image source 614L of the left-eye optical system 602L and an image source 614R of the right-eye optical system 602R to align left-eye and right-eye images provided to the user's left and right eyes based on the depth alignment image acquired by the depth camera 404L and the depth alignment image acquired by the depth camera 404R.

Figure 7:
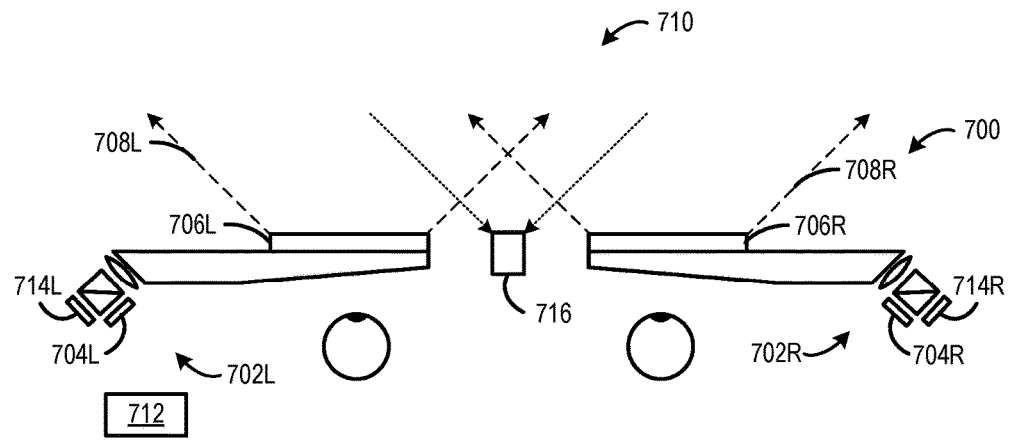
FIG. 7 shows a near-eye display device including left-eye and right-eye alignment optical components in the form of infrared projectors configured to emit different patterns of infrared light towards a physical space.

FIG. 7 shows a display device 700. The display device 700 differs from the above described configurations in that the display device 700 includes left-eye and right-eye optical systems including infrared projectors that emit infrared light into a physical space in front of display device. Further, the display device 700 includes an outward-facing depth camera or other infrared camera configured to acquire depth alignment images or other infrared alignment images from infrared light emitted from both of the infrared projectors and reflected back from the physical space.

The display device 700 includes a left-eye optical system 702L and a right-eye optical system 702R. The left-eye optical system 702L includes an alignment optical component in the form of an infrared projector 704L configured to emit infrared alignment light 708L according to a first structured light pattern. Likewise, the right-eye optical system 702R includes an alignment optical component in the form of an infrared projector 704R configured to emit infrared alignment light 708R according to a second structured light pattern that differs from the first structured light pattern of the infrared alignment light 708L. The left-eye optical system 702L includes a holographic optical component 706L configured to direct the infrared alignment light 708L toward physical space 710. Further, the holographic optical component 706L is configured to direct image light from the image source 714L to the user's left eye such that the user's left eye views a left-eye image. Likewise, the right-eye optical system 702R includes a holographic optical component 706R configured to direct the infrared alignment light 708R toward the physical space 710. Further, the holographic optical component 706R also is configured to direct image light from the image source 714R to the user's right eye such that the user's right eye views a right-eye image.

The display device 700 additionally includes an outward-facing depth camera 716 or other infrared camera configured to acquire one or more depth alignment images or infrared alignment images of the physical space 710 based on the infrared alignment light 708L and the infrared alignment light 708R reflected back from the physical space 710 to the outward-facing depth camera 716. The outward-facing depth camera 716 may be positioned in any suitable location on the display device 700. In one example, the outward-facing depth camera 716 is representative of a camera included in the world-facing vision system 112 of the display device 100 of FIG. 1.

A computing system 712 is configured to calibrate an image source 714L of the left-eye optical system 702L and an image source 714R of the right-eye optical system 702R to align left-eye and right-eye images provided to the user's left and right eyes based on the one or more infrared alignment images acquired by the outward-facing depth camera 716. In one example, the computing system 712 is configured to differentiate between the two optical systems based on the different structured light patterns emitted by the different infrared projectors of the different optical systems. In another example, the two infrared emitters of the two optical systems emit infrared light according to the same pattern, and the computing system 712 is configured to calibrate the image sources of the two optical systems in the same manner as described above with reference to the two visible-light camera configuration of the display device 300.

Figure 8:
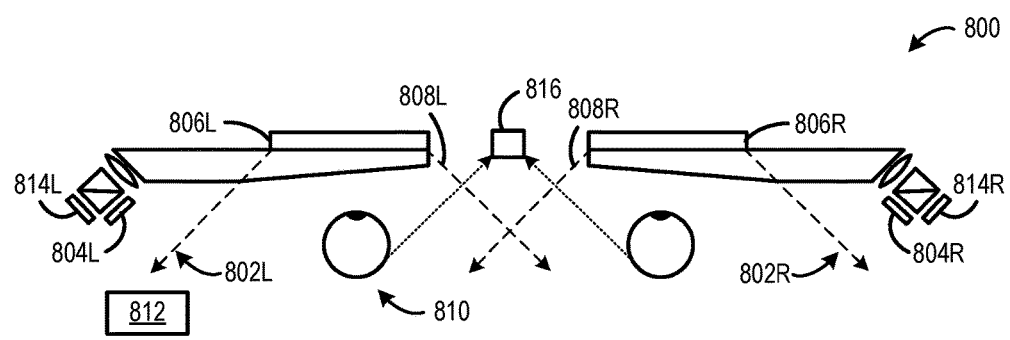
FIG. 8 shows a near-eye display device including left-eye and right-eye alignment optical components in the form of infrared projectors configured to emit different patterns of infrared light towards a user.

FIG. 8 shows a display device 800. The display device 800 differs from the above described configurations in that the display device 800 includes left-eye and right-eye optical systems including infrared projectors that emit infrared light inwardly towards the user instead of outwardly toward the physical space. Further, the display device 800 includes an inward-facing depth camera or other infrared camera configured to acquire depth alignment images or other infrared alignment images from infrared light emitted from both of the infrared projectors and reflected back from the user.

The display device 800 includes a left-eye optical system 802L and a right-eye optical system 802R. The left-eye optical system 802L includes an alignment optical component in the form of an infrared projector 804L configured to emit infrared alignment light 808L according to a first structured light pattern. Likewise, the right-eye optical system 802R includes an alignment optical component in the form of an infrared projector 804R configured to emit infrared alignment light 808R according to a second structured light pattern that differs from the first structured light pattern of the infrared alignment light 808L. The left-eye optical system 802L includes a holographic optical component 806L configured to direct the infrared alignment light 808L towards at least a portion of a user 810. Further, the holographic optical component 806L is configured to direct image light from the image source 814L to the user's left eye such that the user's left eye views a left-eye image. Likewise, the right-eye optical system 802R includes a holographic optical component 806R configured to direct the infrared alignment light 808R towards at least a portion of the user 810. Further, the holographic optical component 806R is configured to direct image light from the image source 814R to the user's right eye such that the user's right eye views a right-eye image.

The display device 800 also includes an inward-facing depth camera 816 configured to acquire one or more depth alignment images or other infrared alignment images based on the infrared alignment light 808L and the infrared alignment light 808R reflected back from the user 810 to the inward-facing depth camera 816. The inward-facing depth camera 816 may be positioned in any suitable location on the display device 800. In one example, the inward-facing depth camera 816 is representative of a camera included in the wearer-facing vision system 114 of the display device 100 of FIG. 1.

A computing system 812 is configured to calibrate an image source 814L of the left-eye optical system 802L and an image source 814R of the right-eye optical system 802R to align left-eye and right-eye images provided to the user's left and right eyes based on the one or more depth alignment images or the other infrared alignment images acquired by the inward-facing depth camera 816. In one example, the computing system 812 is configured to differentiate between the two optical systems based on the different structured light patterns emitted by the different infrared projectors of the different optical systems. In another example, the two infrared emitters of the two optical systems emit infrared light according to the same pattern, and the computing system 812 is configured to calibrate the image sources of the two optical systems in the same manner as described above with reference to the two visible-light camera configuration of the display device 300.

Figure 9A:
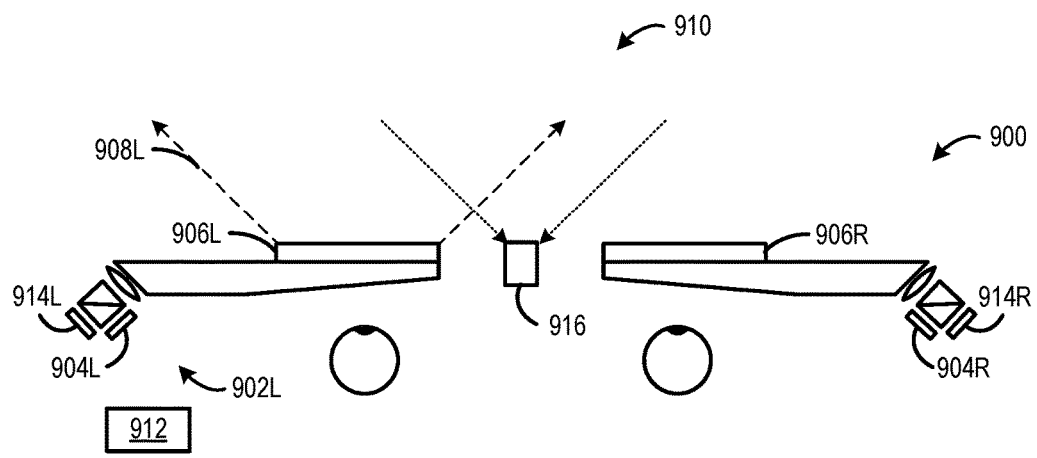
FIGS. 9A-9B show a near-eye display device including left-eye and right-eye alignment optical components in the form of infrared projectors configured to emit infrared light according to a time multiplexing scheme.
Figure 9B:
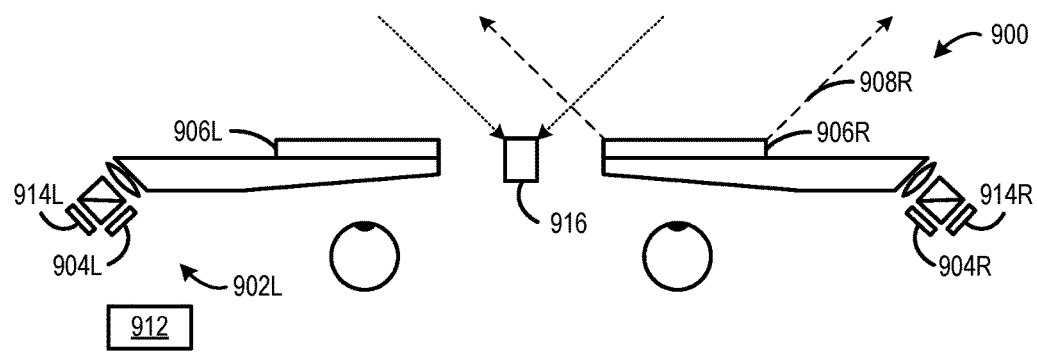

FIGS. 9A-9B show a display device 900. The display device 900 differs from the above described configurations in that the display device 900 includes left-eye and right-eye optical systems including infrared projectors that emit infrared light into a physical space in front of the display device 900 from a user's perspective according to a time multiplexing scheme. Further, the display device 900 includes an outward-facing depth camera or other infrared camera configured to acquire depth alignment images or other infrared alignment images from infrared light emitted from either of the infrared projectors and reflected back from the physical space based on the time multiplexing scheme. The display device 900 includes a left-eye optical system 902L and a right-eye optical system 902R. The left-eye optical system 902L includes an alignment optical component in the form of an infrared projector 904L configured to emit infrared alignment light 908L according to a time multiplexing scheme. For example, as shown in FIG. 9A, at time T1, the infrared projector 904L emits infrared alignment light 908L to a physical space 910 via a holographic optical component 906L. Likewise, the right-eye optical system 902R includes an alignment optical component in the form of an infrared projector 904R configured to emit infrared alignment light 908R according to the time multiplexing scheme. For example, as shown in FIG. 9B, at time T2 subsequent to time T1, the infrared projector 904R emits infrared alignment light 908R to the physical space 910 via a holographic optical component 906R. The holographic optical component 906L also is configured to direct image light from the image source 914L to the user's left eye such that the user's left eye views a left-eye image. Likewise, the holographic optical component 906R also is configured to direct image light from the image source 914R to the user's right eye such that the user's right eye views a right-eye image.

The display device 900 further includes an outward-facing depth camera 916 configured to acquire a plurality of infrared alignment mages of the physical space 910. In particular, different infrared images may capture the infrared alignment light 908L separately from the infrared alignment light 908R according to the time multiplexing scheme. The outward-facing depth camera 916 may be positioned in any suitable location on the display device 900. In one example, the outward-facing depth camera 916 is representative of a camera included in the world-facing vision system 112 of the display device 100 of FIG. 1.

A computing system 912 is configured to calibrate an image source 914L of the left-eye optical system 902L and an image source 914R of the right-eye optical system 902R to align left-eye and right-eye images provided to the user's left and right eyes based on the plurality of depth alignment images acquired by the outward-facing depth camera 916.

As the alignment images for the different optical systems are acquired at different times, a pose of the display device may change in between different alignment images. Accordingly, the computing system 912 may be configured to compensate for changes in pose when calibrating the image sources based on the alignment images, or to perform alignment when the system is determined to be suitably stationary (e.g. from motion sensor data).

Figure 10:
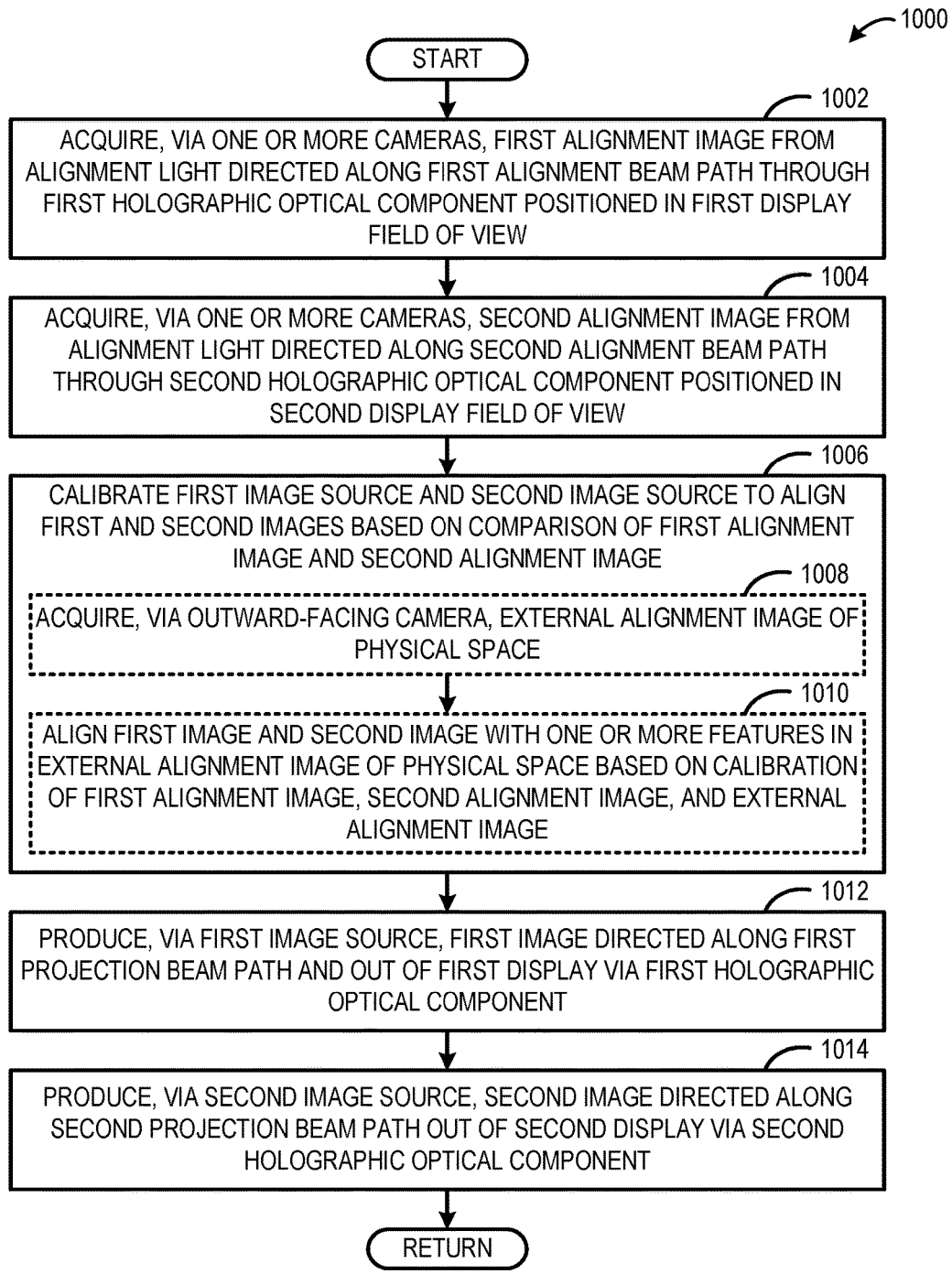
FIG. 10 shows an example method for aligning left and right eye images.

FIG. 10 shows an example method 1000 for calibrating image sources of a binocular, near-eye display device, such as the display device 100 of FIG. 1. At 1002, method 1000 includes acquiring, via one or more cameras, a first alignment image via alignment light directed along a first alignment beam path through a first holographic optical component positioned in a field of view of a first display. For example, the first alignment beam path may extend from the first holographic optical component through an associated optical system in which the first holographic optical component is included.

At 1004, method 1000 includes acquiring, via one or more cameras, a second alignment image from alignment light directed along a second alignment beam path through a second holographic optical component positioned in a field of view of a second display. For example, the second alignment beam path may extend from the second holographic optical component through an associated optical system in which the second holographic optical component is included. The direction in which the above described alignment light travels through the holographic optical component and the associated optical system depends on whether an alignment optical component of the associated optical system takes the form of a camera or a projector.

At 1006, the method 1000 includes calibrating a first image source and a second image source to align left-eye and right-eye virtual images based on the first alignment image and the second alignment image. For example, calibrating may include determining positional offsets (e.g., along the X axis and/or the Y axis of the field of view) of either or both the virtual images provided by the image source of left-eye optical system and the image source of the right eye-optical system, and calibrating these image sources based on the determined positional offsets in order to align the left-eye and right-eye virtual images. In another example, calibrating may include adjusting one or more of the image sources to distort (e.g., stretch, shrink) at least a portion of the virtual image produced by the image source to compensate for any deformations of the associated optical system. Any suitable image production parameter of an image source may be adjusted during the calibration process to align the virtual images.

In some implementations, calibrating may further include aligning the left-eye and right-eye images with one or more features of an external image of a physical space, wherein the term "external image" indicates that the image was acquired via a camera external to the left-eye and right-eye optical systems. Accordingly, at 1008, the method 1000 optionally may include acquiring, via an outward-facing camera, an external alignment image of a physical space, and at 1010, aligning the first image and the second image with the one or more features in the external alignment image of the physical space based on a calibration of the first alignment image, the second alignment image, and the external alignment image. The first image and the second image may be aligned with the external alignment image of the physical space using any suitable algorithm, including but not limited to those described above.

At 1012, the method 1000 includes producing, via the first image source, a first image directed along a first projection beam path through the first holographic optical component and out of the first display to a first eye of the user, wherein the first projection beam path shares a common optical path with the first alignment beam path. At 1014, the method 1000 includes producing, via the second image source, a second image directed along a second projection beam path through the second holographic optical component and out of the second display to the second eye of the user, wherein the second projection beam path shares a common optical path with the second alignment beam path.

Figure 11:
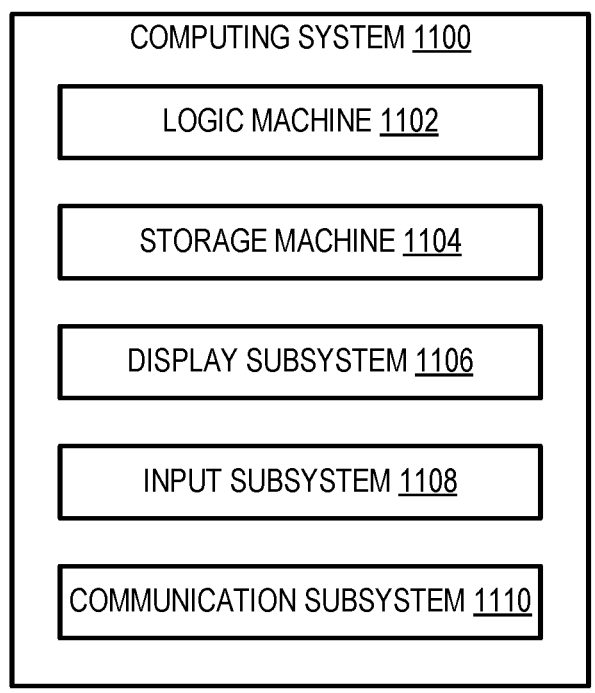
FIG. 11 shows an example computing system.

FIG. 11 schematically shows a non-limiting implementation of a computing system 1100 that can enact one or more of the methods and processes described above. Computing system 1100 is shown simplified form. Computing system 1100 may take the form of one or more personal computers, server computers, tablet computers, home-entertainment computers, network computing devices, gaming devices, mobile computing devices, mobile communication devices (e.g., smart phone), virtual-reality devices, and/or other computing devices. For example, the computing system 1100 may be anon-limiting example of the computing system 108 of the display device 100 of FIG. 1.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine 1102 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1102 may include one or more processors configured to execute software instructions. Additionally or alternatively, the logic machine 1102 may include one or more hardware or firmware logic machines configured to execute hardware or firmware instructions. Processors of the logic machine 1102 may be single-core or multi-core, and the instructions executed thereon may be configured for sequential, parallel, and/or distributed processing. Individual components of the logic machine 1102 optionally may be distributed among two or more separate devices, which may be remotely located and/or configured for coordinated processing. Aspects of the logic machine 1102 may be virtualized and executed by remotely accessible, networked computing devices configured in a cloud-computing configuration.

Storage machine 1104 includes one or more physical devices configured to hold instructions executable by the logic machine 1102 to implement the methods and processes described herein. When such methods and processes are implemented, the state of storage machine 1104 may be transformed to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices. As a non-limiting example, display subsystem 1106 may include the near-eye displays described above.

When included, input subsystem 1108 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem 1110 may allow computing system 1100 to send and/or receive messages to and/or from other devices via a network such as the Internet.

Figure 12A:
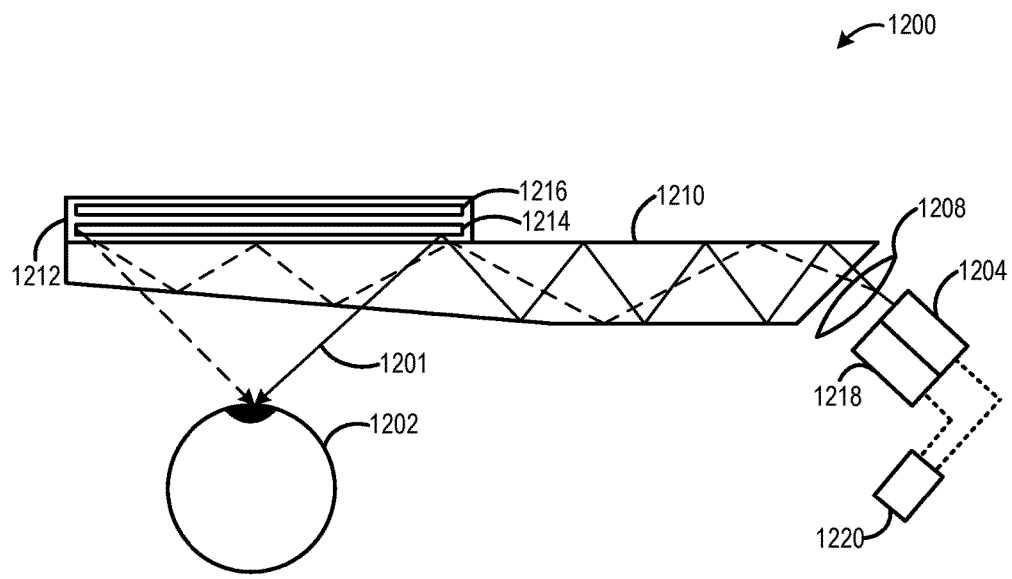
FIGS. 12A-12B show another example optical system for a near-eye display device.
Figure 12B:
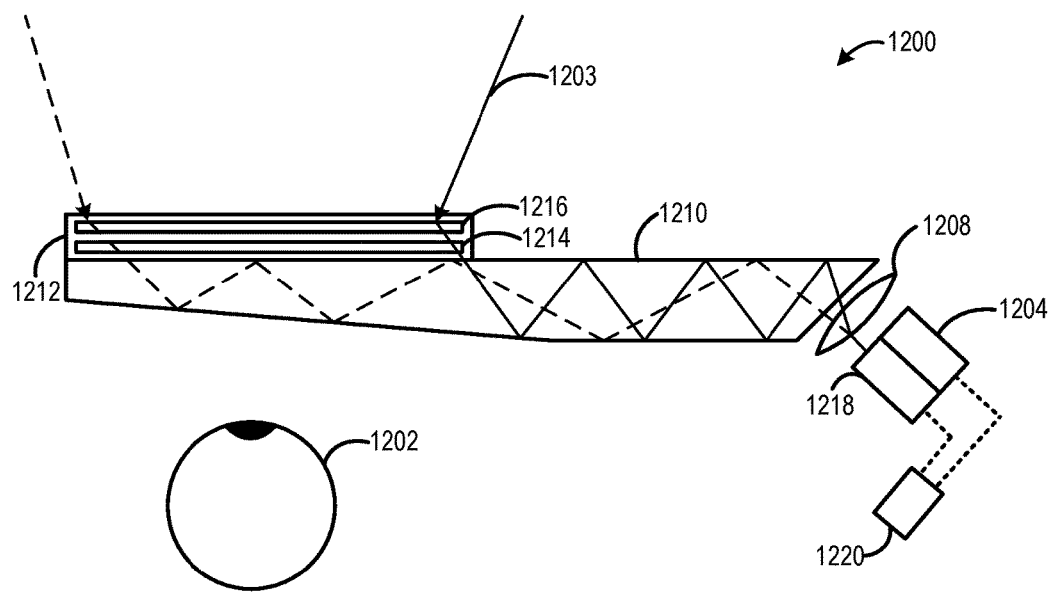

FIGS. 12A-12B show another example optical system 1200. Instead of utilizing a beam splitter, optical system 1200 includes an image source and an alignment optical component in a side-by-side configuration. The optical system 1200 is an example of a system that may be used as the left-eye optical system 102L and the right-eye optical system 102R of the display device 100 of FIG. 1, and/or with any other suitable near-eye display device. FIG. 12A shows the optical system 1200 providing image light 1201 to a user eye 1202, while FIG. 12B shows the optical system 1200 emitting or receiving alignment light 1203, depending upon the alignment method used. The alignment light 1203 is used to calibrate the optical system 1200 with a corresponding right-eye optical system, as discussed above.

As shown in FIG. 12A, an image source 1204 outputs the image light 1201 to a lens 1208. The lens 1208 is configured to direct the image light 1201 at a suitable angle to enter a wave guide 1210. The image light 1201 may propagate through the wave guide 1210 by total internal reflection until it exits the wave guide 1210 at a holographic optical component 1212. The holographic optical component 1212 comprises a holographic film that is applied to at least a portion of the display windows 106 of display device 100 of FIG. 1. The holographic optical component 1212 includes an image hologram 1214 and an alignment hologram 1216. The image hologram 214 is configured to diffract the image light 1201 to the user's eye 1202 to produce a virtual image. In this manner, the image light 1201 travels along a projection beam path extending between the image source 1204 and the holographic optical component 1212

Furthermore, as shown in FIG. 12B, an alignment optical component 1218 is configured to provide or receive the alignment light 1203. In some implementations, the alignment optical component 1218 includes a camera configured to acquire an alignment image from received alignment light 1203. In such implementations, the alignment light 1203 enters the optical system 1200 via the alignment hologram 1216, which diffracts the alignment light into the wave guide 1210 at a suitable angle for the alignment light 1203 to totally internally reflect through the wave guide 1210. The alignment light 1203 propagates through the wave guide 1210, and exits the wave guide 210 toward the lens 1208. The lens 1208 directs the alignment light 1203 to the camera to acquire an alignment image. In this manner, the alignment light 1203 travels along an alignment beam path extending between the holographic optical component 1212 and the alignment optical component 1218. In this implementation, the alignment light 1203 shares a common optical path with the image light 1201 between the holographic optical component 1212 and the lens 1208, and the alignment light 1203 and the image light 1201 travel in opposite directions.

In other implementations, the alignment optical component 1218 includes an infrared projector configured to emit infrared alignment light 1203. The infrared alignment light 1203 travels through the optical system 1200 along the same alignment beam path, but in the opposite direction, relative to implementations in which the alignment optical component 1218 includes a camera. In such an implementation, the infrared projector emits the infrared alignment light 1203 through the lens 1208 and into the wave guide 1210. The infrared alignment light 1203 propagates through the waveguide to the alignment hologram, which redirects the light into the physical environment. In implementations where the alignment optical component 1218 emits infrared light, the display device may further comprise an infrared camera (e.g., a depth camera of either of the vision systems 112 or 114 of FIG. 1) configured to capture images of the infrared alignment light 1203 reflected from the physical space to form an infrared alignment image, which is a two-dimensional image or a depth image.

A computing system 1220 is configured to calibrate the image source 1204 with a corresponding image source of a left-eye optical system, and control the image source 1204 to provide a virtual image to the user's right eye 1202 that is aligned with a virtual image provided to the user left eye.

In particular, the computing system 1220 calibrates the image source of each optical system based on alignment images generated from the alignment light 1203, for example, to help compensate for various distortions in either of the optical systems due to deformation (e.g., twisting or bending), and thus to align the virtual images provided to each user eye.

In the configuration described above, the image source 1204 and the alignment optical component 1218 are oriented in a side-by-side configuration in which a projection beam path of the image light 1201 and the alignment beam path of the alignment light 1203 are parallel or near parallel. Thus, as mentioned above, a beam splitter may be omitted from the optical system 1200, as the image light 1201 travels directly between the image source 1204 and lens 1208 while the alignment light 1203 travels directly between the alignment optical component 1218 and the lens 1208.

In another example, a near-eye display device comprises a left-eye optical system and a right-eye optical system, each of the left-eye optical system and the right-eye optical system comprises a light-deflecting optical component positioned in a field of view of a user eye, an image source configured to emit imaging light, and an alignment optical component, a projection beam path between the image source and the light-deflecting optical component and an alignment beam path between the alignment optical component and the light-deflecting optical component share a common optical path. In this example, each of the left-eye optical system and the right-eye optical system alternatively or additionally may further comprises a beam splitter configured to split the common optical path into 1) the alignment beam path extending between the beam splitter and the alignment optical component and 2) the projection beam path extending between the beam splitter and the image source. In this example, the alignment optical component alternatively or additionally may include a camera configured to acquire an alignment image, and the near-eye display device may further comprise a computing system configured to calibrate the image source of the left-eye optical system and the image source of the right-eye optical system to align a left-eye image produced from the imaging light emitted by the image source of left-eye optical system with a right-eye image produced from imaging light emitted by the image source of the fight-eye optical system based on the alignment image acquired by the camera of the left-eye optical system and the alignment image acquired by the camera of the right-eye optical system. In this example, the camera alternatively or additionally may be a visible-light camera, and the alignment image alternatively or additionally may be a visible-light image. In this example, the near-eye display device alternatively or additionally may further comprise an infrared projector configured to emit infrared light, the camera may be a depth camera, the infrared light may be reflected to the depth camera via the alignment beam path, and the alignment image may be an infrared light image that includes reflected infrared light from the infrared projector. In this example, the near-eye display device alternatively or additionally may further comprise an outward-facing camera configured to acquire an external alignment image of a physical space from light that does not travel through the left-eye optical system or the right-eye optical system, and the computing system alternatively or additionally may be configured to align the left-eye image and the right-eye image with one or more features in the external alignment image of the physical space based on a calibration of the alignment image acquired by the camera of the left-eye optical system, the alignment image acquired by the camera of the right-eye optical system, and the external alignment image. In this example, the holographic optical component alternatively or additionally may be configured to direct light from a portion of a physical space viewable through the field of view from a perspective of the user eye to the camera. In this example, the alignment optical component alternatively or additionally may include an infrared projector configured to emit infrared light via the alignment beam path, and the near-eye display device may further comprise a depth camera configured to acquire infrared light emitted by the infrared projector of the left-eye optical system and infrared light emitted by the infrared projector of the right-eye optical system. In this example, the alignment beam path alternatively or additionally may be configured to direct the infrared light towards a portion of a physical space viewable through the field of view from a perspective of the user eye, and the depth camera may be positioned to acquire infrared light reflected from the physical space. In this example, the alignment beam path alternatively or additionally may be configured to direct the infrared light towards a user of the near-eye display device, and the depth camera may be positioned to acquire infrared light reflected from the user. In this example, the infrared projector of the left-eye optical system and the infrared projector of the right-eye optical system alternatively or additionally may be configured to emit infrared light according to a time multiplexing scheme. In this example, the image source and alignment component alternatively or additionally may be positioned side-by-side to form the common optical path shared by the alignment beam path and the projection beam path.

In another example, a near-eye display device comprises a left-eye optical system and a right-eye optical system, each of the left-eye optical system and the right-eye optical system comprises a holographic optical component positioned in a field of view of a user eye, an image source configured to emit imaging light, a camera configured to acquire an alignment image, and a beam splitter configured to split a common optical path extending between the beam splitter and the holographic optical component into an alignment beam path extending between the beam splitter and the camera, and a projection beam path extending between the beam splitter and the image source, and a computing system configured to calibrate the image source of the left-eye optical system and the image source of the right-eye optical system to align a left-eye image produced from the imaging light emitted by the image source of the left-eye optical system and a right-eye image produced from imaging light emitted by the image source of the right-eye optical system based on the alignment image acquired by the camera of the left-eye optical system and the alignment image acquired by the camera of the right-eye optical system. In this example, the camera alternatively or additionally may be a visible-light camera, and wherein the alignment image may be a visible-light image. In this example, the camera alternatively or additionally may be a depth camera, the near-eye display device may further comprise an infrared projector configured to emit infrared light, the infrared light may be reflected to the depth camera via the alignment beam path, and the alignment image may be an infrared light image that includes reflected infrared light from the infrared projector. In this example, the near-eye display device alternatively or additionally may further comprise an outward-facing camera configured to acquire an external alignment image of a physical space from light that does not travel through the left-eye optical system or the right-eye optical system, and the computing system may be configured to align the left-eye image and the right-eye image with one or more features in the external alignment image of the physical space based on a calibration of the alignment image acquired by the camera of the left-eye optical system, the alignment image acquired by the camera of the right-eye optical system, and the external alignment image. In this example, the holographic optical component alternatively or additionally may be configured to direct light from a portion of a physical space viewable through the field of view from a perspective of the user eye to the camera. In this example, the holographic optical component alternatively or additionally may be configured to direct light reflected from the user of the near-eye display device to the camera.

In another example, a binocular calibration method for a near-eye display device comprises acquiring, via a left-side camera, a left-side alignment image from alignment light directed along a left-side alignment beam path from a left-eye holographic optical component positioned in a left display, acquiring, via a right-side camera, a right-side alignment image from alignment light directed along a right-side alignment beam path from a right-eye holographic optical component positioned in a right display, calibrating a left-eye image source and a right-eye image source based on comparing the left-side alignment image and the right-side alignment image, producing, via the left-eye image source, a left-eye image directed along a left-side projection beam path and out of the left display via the left-eye holographic optical component, and producing, via the right-eye image source, a right-eye image directed along a right-side projection beam path and out of the right display via the right-eye holographic optical component. In this example, the method alternatively or additionally may further comprise acquiring, via an outward-facing camera, an external alignment image of a physical space from light that does not travel down the left-side alignment beam path and does not travel down the right-side alignment beam path, and aligning the left-eye image and the right-eye image with one or more features in the external alignment image of the physical space based on a calibration of the first alignment image, the second alignment image, and the external alignment image.

It will be understood that the configurations and/or approaches described herein are presented for example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A near-eye display device, comprising:
  a left-eye optical system and a right-eye optical system, each of the left-eye optical system and the right-eye optical system comprising:
    a light-deflecting optical component positioned to be in a field of view of a user eye;
    an image source configured to emit imaging light for deflection by the light-deflecting optical component toward the user eye;

a camera configured to acquire an alignment image based on alignment light deflected by the light-deflecting optical component, wherein a projection beam path of the imaging light between the image source and the light-deflecting optical component and an alignment beam path of the alignment light between the camera and the light-deflecting optical component share a common optical path; and a computing system configured to calibrate the image source of the left-eye optical system and the image source of the right-eye optical system to align a left-eye image produced from the imaging light emitted by the image source of left-eye optical system with a right-eye image produced from imaging light emitted by the image source of the right-eye optical system based on the alignment image acquired by the camera of the left-eye optical system and the alignment image acquired by the camera of the right-eye optical system.

2. The near-eye display device of claim 1, wherein each of the left-eye optical system and the right-eye optical system further comprises:

a beam splitter configured to split the common optical path into 1) the alignment beam path extending between the beam splitter and the camera and 2) the projection beam path extending between the beam splitter and the image source.

3. The near-eye display device of claim 1, wherein the camera is a visible-light camera, and wherein the alignment image is a visible-light image.

4. The near-eye display device of claim 1, further comprising an infrared projector configured to emit infrared light, wherein the camera is a depth camera, wherein the infrared light is reflected to the depth camera via the alignment beam path, and wherein the alignment image is an infrared light image that includes reflected infrared light from the infrared projector.

5. The near-eye display device of claim 1, further comprising an outward-facing camera configured to acquire an external alignment image of a physical space from light that does not travel through the left-eye optical system or the right-eye optical system, and wherein the computing system is configured to align the left-eye image and the right-eye image with one or more features in the external alignment image of the physical space based on a calibration of the alignment image acquired by the camera of the left-eye optical system, the alignment image acquired by the camera of the right-eye optical system, and the external alignment image.

6. The near-eye display device of claim 1, wherein the light-deflecting optical component is configured to direct light from a portion of a physical space viewable through the field of view from a perspective of the user eye to the camera.

7. The near-eye display device of claim 1, wherein each of the left-eye optical system and the right-eye optical system further comprises an infrared projector configured to emit infrared light via the alignment beam path, and wherein the camera is a depth camera configured to acquire infrared light emitted by the infrared projector of the left-eye optical system and infrared light emitted by the infrared projector of the right-eye optical system.

8. The near-eye display device of claim 7, wherein the alignment beam path is configured to direct the infrared light towards a portion of a physical space viewable through the field of view from a perspective of the user eye, and wherein the depth camera is positioned to acquire infrared light reflected from the physical space.

9. The near-eye display device of claim 7, wherein the alignment beam path is configured to direct the infrared light towards a user of the near-eye display device, and wherein the depth camera is positioned to acquire infrared light reflected from the user.

10. The near-eye display device of claim 7, wherein the infrared projector of the left-eye optical system and the infrared projector of the right-eye optical system are configured to emit infrared light according to a time multiplexing scheme.

11. The near-eye display device of claim 1, wherein the image source and camera are positioned side-by-side to form the common optical path shared by the alignment beam path and the projection beam path.

12. A near-eye display device, comprising:

a left-eye optical system and a right-eye optical system, each of the left-eye optical system and the right-eye optical system comprising:

a holographic optical component positioned to be in a field of view of a user eye;

an image source configured to emit imaging light for deflection by the holographic optical component toward the user eye;

a camera configured to acquire an alignment image based on alignment light deflected by the holographic optical component; and a beam splitter configured to split a common optical path extending between the beam splitter and the holographic optical component into an alignment beam path for the alignment light extending between the beam splitter and the camera, and a projection beam path for the imaging light extending between the beam splitter and the image source; and a computing system configured to calibrate the image source of the left-eye optical system and the image source of the right-eye optical system to align a left-eye image produced from the imaging light emitted by the image source of the left-eye optical system and a right-eye image produced from imaging light emitted by the image source of the right-eye optical system based on the alignment image acquired by the camera of the left-eye optical system and the alignment image acquired by the camera of the right-eye optical system.

13. The near-eye display device of claim 12, wherein the camera is a visible-light camera, and wherein the alignment image is a visible-light image.

14. The near-eye display device of claim 12, wherein the camera is a depth camera, wherein the near-eye display device further comprises an infrared projector configured to emit infrared light, wherein the infrared light is reflected to the depth camera via the alignment beam path, and wherein the alignment image is an infrared light image that includes reflected infrared light from the infrared projector.

15. The near-eye display device of claim 12, further comprising an outward-facing camera configured to acquire an external alignment image of a physical space from light that does not travel through the left-eye optical system or the right-eye optical system, and wherein the computing system is configured to align the left-eye image and the right-eye image with one or more features in the external alignment image of the physical space based on a calibration of the alignment image acquired by the camera of the left-eye optical system, the alignment image acquired by the camera of the right-eye optical system, and the external alignment image.

16. The near-eye display device of claim 12, wherein the holographic optical component is configured to direct light from a portion of a physical space viewable through the field of view from a perspective of the user eye to the camera.

17. The near-eye display device of claim 12, wherein the holographic optical component is configured to direct light reflected from the user of the near-eye display device to the camera.

18. A binocular calibration method for a near-eye display device, the method comprising:
- acquiring, via a left-side camera, a left-side alignment image from alignment light directed along a left-side alignment beam path from a left-eye holographic optical component positioned in a left display;
- acquiring, via a right-side camera, a right-side alignment image from alignment light directed along a right-side alignment beam path from a right-eye holographic optical component positioned in a right display;
- calibrating a left-eye image source and a right-eye image source based on comparing the left-side alignment image and the right-side alignment image;
- producing, via the left-eye image source, a left-eye image directed along a left-side projection beam path and out of the left display via the left-eye holographic optical component, wherein the left-side projection beam path of the left-eye image between the left-eye image source and the left-eye holographic optical component and the left-side alignment beam path of the left-side alignment image between the left-side camera and the left-eye holographic optical component share a common left-side optical path; and
- producing, via the right-eye image source, a right-eye image directed along a right-side projection beam path and out of the right display via the right-eye holographic optical component, wherein the right-side projection beam path of the right-eye image between the right-eye image source and the right-eye holographic optical component and the right-side alignment beam path of the right-side alignment image between the right-side camera and the right-eye holographic optical component share a common right-side optical path.

19. The method of claim 18, further comprising:
- acquiring, via an outward-facing camera, an external alignment image of a physical space from light that does not travel down the left-side alignment beam path and does not travel down the right-side alignment beam path; and
- aligning the left-eye image and the right-eye image with one or more features in the external alignment image of the physical space based on a calibration of the left-side alignment image, the right-side alignment image, and the external alignment image.

* * * * *